(12) United States Patent
McCaffrey

(10) Patent No.: US 10,502,060 B2
(45) Date of Patent: Dec. 10, 2019

(54) ROTOR AND GAS TURBINE ENGINE INCLUDING SAME

(71) Applicant: UNITED TECHNOLOGIES CORPORATION, Farmington, CT (US)

(72) Inventor: Michael G. McCaffrey, Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 385 days.

(21) Appl. No.: 14/742,162

(22) Filed: Jun. 17, 2015

(65) Prior Publication Data

US 2015/0369047 A1 Dec. 24, 2015

Related U.S. Application Data

(60) Provisional application No. 62/013,767, filed on Jun. 18, 2014.

(51) Int. Cl.
*F01D 5/12* (2006.01)
*F01D 5/08* (2006.01)
*F04D 29/58* (2006.01)
*F04D 29/32* (2006.01)

(52) U.S. Cl.
CPC ............. *F01D 5/082* (2013.01); *F01D 5/12* (2013.01); *F04D 29/321* (2013.01); *F04D 29/584* (2013.01); *F05D 2220/32* (2013.01); *F05D 2250/12* (2013.01); *F05D 2250/13* (2013.01); *F05D 2250/71* (2013.01); *F05D 2260/20* (2013.01); *F05D 2260/2212* (2013.01); *Y02T 50/671* (2013.01); *Y02T 50/676* (2013.01)

(58) Field of Classification Search
CPC .......... F01D 5/082; F01D 5/084; F01D 5/085; F01D 5/12; F04D 29/321; Y02T 50/676
See application file for complete search history.

(56) References Cited

U.S. PATENT DOCUMENTS

| | | | |
|---|---|---|---|
| 4,919,590 A | 4/1990 | Stratford et al. | |
| 8,328,507 B2 | 12/2012 | McCaffrey | |
| 8,540,483 B2 | 9/2013 | Bintz et al. | |
| 2003/0133788 A1* | 7/2003 | Avignon | F01D 5/082 415/115 |

(Continued)

FOREIGN PATENT DOCUMENTS

| | | |
|---|---|---|
| DE | 2639511 A1 | 3/1977 |
| EP | 2628904 A2 | 8/2013 |

OTHER PUBLICATIONS

English Abstract for DE2639511A1—Mar. 17, 1977; 1 pg.
European Search Report for Application No. 15171745.1-1610; dated Oct. 26, 2015; 7 pgs.

*Primary Examiner* — Marina A Tietjen
*Assistant Examiner* — Paul J Gray
(74) *Attorney, Agent, or Firm* — Cantor Colburn LLP

(57) ABSTRACT

A rotor for a gas turbine engine includes a plurality of blades which extend from a rotor disk. One or more cooling features may be incorporated radially inboard from the rotor disk rim that operate to induce vortices adjacent to the disk rim and/or disk web. The vortices increase the local velocity in the secondary cooling air flow path and therefore increase the heat transfer rate from the rotor to the secondary cooling air flow path.

18 Claims, 5 Drawing Sheets

(56) References Cited

U.S. PATENT DOCUMENTS

2011/0033303 A1    2/2011  Pegouet
2012/0003091 A1*  1/2012  Segovia .................. F01D 5/082
                                                          416/95
2014/0234076 A1    8/2014  Lee et al.

* cited by examiner

ROTOR AND GAS TURBINE ENGINE INCLUDING SAME

CROSS REFERENCE TO RELATED APPLICATION

This application claims the benefit of and incorporates by reference herein the disclosure of U.S. Ser. No. 62/013,767, filed Jun. 18, 2014.

TECHNICAL FIELD OF THE DISCLOSURE

The present disclosure relates generally to a gas turbine engine, and more specifically to a rotor for a gas turbine engine.

BACKGROUND OF THE DISCLOSURE

Gas turbine rotor systems include successive rows of blades, which extend from respective rotor disks that are arranged in an axially stacked configuration. The rotor stack may be assembled through a multitude of systems such as fasteners, fusion, tie-shafts and combinations thereof.

Gas turbine rotor systems operate in an environment in which significant pressure and temperature differentials exist across component boundaries which primarily separate a core gas flow path and a secondary cooling air flow path. For high-pressure, high-temperature applications, the components experience thermo-mechanical fatigue (TMF) across these boundaries. Although resistant to the effects of TMF, the components may be of a heavier-than-optimal weight for desired performance requirements.

Increasing high pressure compressor (HPC) pressure ratio, and by extension, the overall engine pressure ratio (OPR), has been shown to improve overall engine cycle efficiency. One result of the higher OPR is an increase in the HPC discharge air temperature. At very high OPR, the temperature exiting the HPC may exceed the allowable metal temperatures of HPC disk alloys. Maintaining a lightweight, high efficiency engine includes cooling the HPC disks to keep the temperature in the disk material's region of high strength.

However, cooling discretely bladed disks and drums, or integrally bladed rotors (IBRs), is hampered by the relative surface area exposed to the hot HPC core gas flow path, versus the internal surface area exposed to the secondary cooling air flow path.

SUMMARY OF THE DISCLOSURE

In one embodiment, a rotor for a gas turbine engine is disclosed, the rotor comprising: a disk including a rim and a radially extending web connected to one another at a junction; and at least one cooling feature extending from at least one of the rim, the web, or the junction; wherein each of the at least one cooling features comprises a circumferentially extending ring.

In a further embodiment of the above, the rim includes a radially outer rim surface and a radially inner rim surface, the rotor further comprising: a plurality of blades which extend from the radially outer rim surface.

In a further embodiment of any of the above, each of the at least one cooling features is configured to increase a velocity of air adjacent the rotor when the rotor is rotating.

In a further embodiment of any of the above, the circumferentially extending ring comprises a plurality of sections combined to form a ring.

In a further embodiment of any of the above, the rotor includes an axis of rotation; and one of the at least one cooling features includes a feature longitudinal axis that is substantially perpendicular to the axis of rotation.

In a further embodiment of any of the above, the rotor includes an axis of rotation; and one of the at least one cooling features includes a feature longitudinal axis that is disposed at an angle to the axis of rotation.

each of the at least one cooling features comprises an axially upstream feature side and an axially downstream feature side; and the axially upstream feature side and the axially downstream feature side of one of the at least one cooling features are substantially parallel.

In a further embodiment of any of the above, each of the at least one cooling features comprises an axially upstream feature side and an axially downstream feature side; and the axially upstream feature side and the axially downstream feature side of one of the at least one cooling features taper.

In a further embodiment of any of the above, the taper is multiple.

In a further embodiment of any of the above, said one of the at least one cooling features tapers with multiple radii of curvature.

In a further embodiment of any of the above, one of the at least one cooling features includes a feature longitudinal axis that includes curvature.

In a further embodiment of any of the above, one of the at least one cooling features comprises a thickness that is substantially constant.

In a further embodiment of any of the above, one of the at least one cooling features comprises a thickness that varies in steps.

In a further embodiment of any of the above, the rotor includes an axis of rotation; the web comprises a web longitudinal axis substantially perpendicular to the axis of rotation; and the at least one cooling feature is disposed on only one side of the web longitudinal axis.

In another embodiment, a spool for a gas turbine engine is disclosed, the spool comprising: a compressor rotor disk including a rim and a radially extending web connected to one another at a junction; and at least one cooling feature extending from at least one of the rim, the web, or the junction; wherein each of the at least one cooling features comprises a circumferentially extending ring.

In a further embodiment of the above, the rotor includes an axis of rotation; and one of the at least one cooling features includes a feature longitudinal axis that is substantially perpendicular to the axis of rotation.

In a further embodiment of any of the above, the rotor includes an axis of rotation; and one of the at least one cooling features includes a feature longitudinal axis that is disposed at an angle to the axis of rotation.

In a further embodiment of any of the above, each of the at least one cooling features comprises an axially upstream feature side and an axially downstream feature side; and the axially upstream feature side and the axially downstream feature side of one of the at least one cooling features taper.

In a further embodiment of any of the above, one of the at least one cooling features includes a feature longitudinal axis that includes curvature.

In a further embodiment of any of the above, one of the at least one cooling features comprises a thickness that is substantially constant.

In a further embodiment of any of the above, the rotor includes an axis of rotation; the web comprises a web longitudinal axis substantially perpendicular to the axis of rotation; and the at least one cooling feature is disposed on only one side of the web longitudinal axis.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
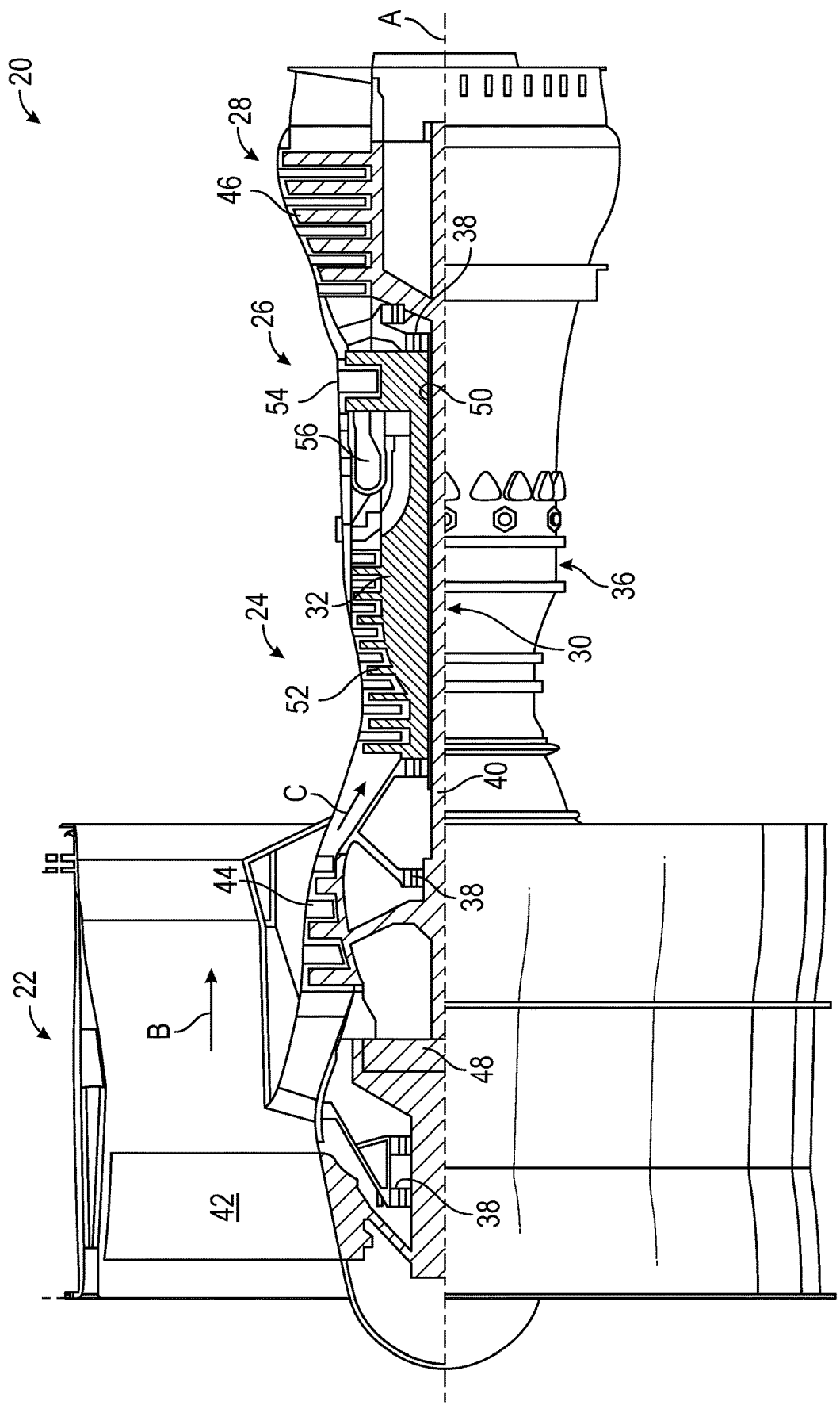
FIG. 1 is a schematic partial cross-sectional view of a gas turbine engine in an embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram} \,^\circ\, \text{R})/(518.7^\circ \text{R})]^{0.5}$. The "Low corrected fan tip speed" as disclosed herein according to one non-limiting embodiment is less than about 1150 ft/second (350.5 m/sec).

Figure 2:
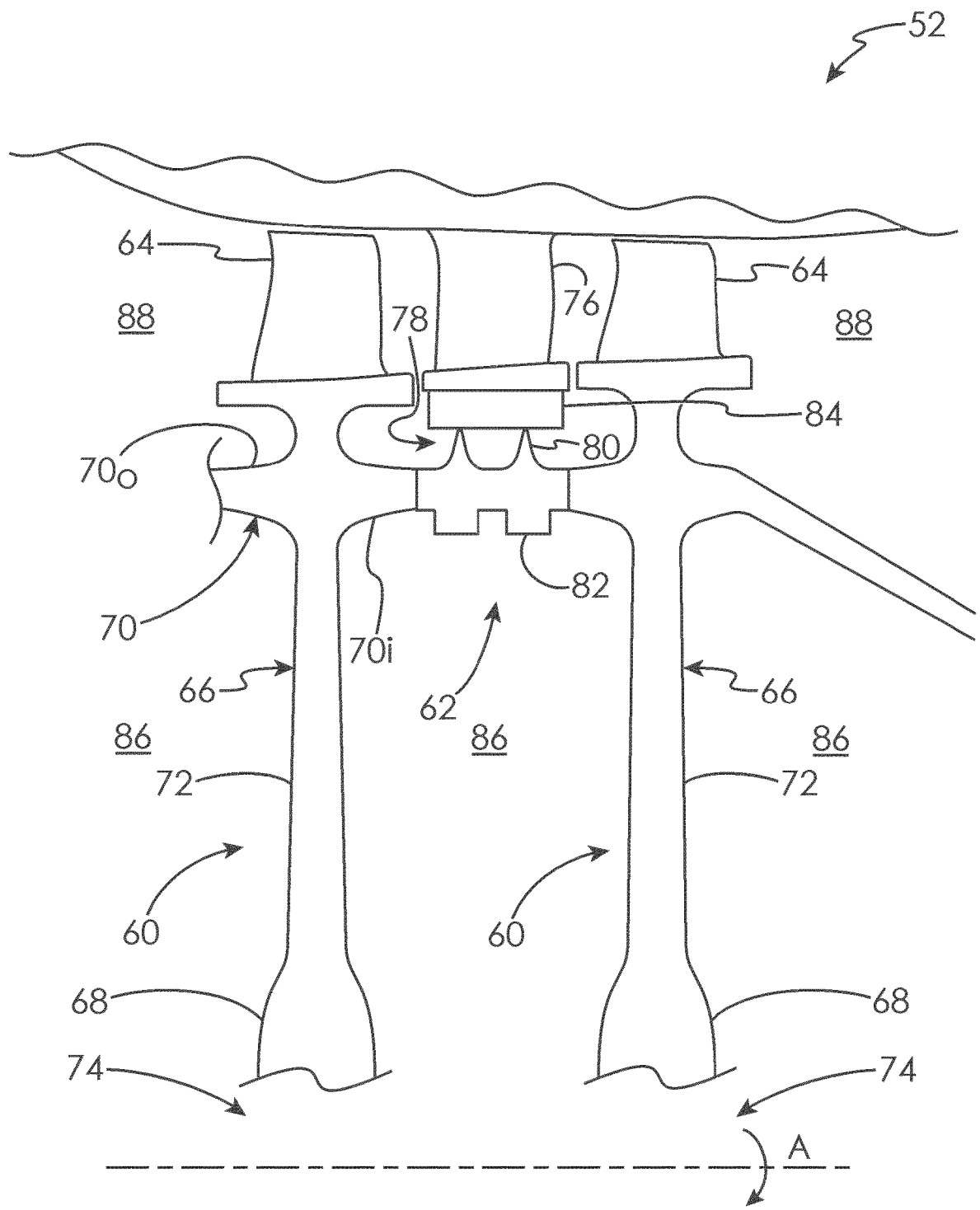
FIG. 2 is a schematic cross-sectional view of a portion of a high pressure compressor section in an embodiment.

With reference to FIG. 2, the high pressure compressor (HPC) 52 is assembled from a plurality of successive HPC rotors 60. Each rotor 60 generally includes a plurality of blades 64 circumferentially disposed around a rotor disk 66. The rotor disk 66 generally includes a hub 68, a rim 70, and a web 72 which extends therebetween. The rim 70 includes a radially outer rim surface 70o and a radially inner rim surface 70i. The blades 64 extend radially outward from the radially outer rim surface. The hub 68 includes a bore 74 therethrough and rotates about the axis A. Each rotor 60 may be formed with discrete blades 64 that are mounted into slots formed in the rotor disk 66. Each rotor 60 may alternatively be formed as an integrally bladed rotor (IBR) machined as a single unitary structure.

A seal support member 62 is disposed between adjacent rotors 60 and adjacent to a plurality of stationary vanes 76. A seal assembly 78 is provided to maintain a seal between the seal support member 62 and the vanes 76. In the illustrated embodiment, the seal assembly 78 comprises a knife edge seal, but other types of seals may also be used.

The illustrated seal assembly 78 includes at least one blade member 80, at least one cooling fin 82, and a seal pad 84. The blade member 80 and cooling fin 82 are part of a circumferentially extending ring that may be a unitary piece or a plurality of sections that can be combined to form a ring. In the embodiment shown in FIG. 2, the blade members 80 and cooling fins 82 are integrally attached to one another as a unitary body. In other embodiments, the blade members 80 and cooling fins 82 may be formed independent of one another and joined to form the ring structure.

The seal pad 84 is a circumferentially extending hoop that may be a unitary structure or may be a plurality of sections combined to form a hoop. The width of the seal pad 84 is great enough to ensure the seal pad 84 is aligned with the one or more blade members 80 in the event of axial movement of one or both of the seal pad 84 and the blade members 80 relative to the other during operation of the engine 20. The seal pad 84 may be made from a material that abrades upon contact with a blade member 80.

Regions 86 comprise the secondary cooling air flow path that provides a means for sinking heat from the cooling fins 82 and other surfaces of the rotor 60 and seal support member 62. Each blade member 80 and cooling fin 82 is aligned with the other on opposite sides of the seal support member 62. In those embodiments having a plurality of blade members 80, there is an equal number of cooling fins 82. The blade members 80 and cooling fins 82 are aligned as pairs; i.e., each blade member 80 has a paired cooling fin 82 aligned on the opposite side of the seal support member 62. The illustrated embodiment seal assembly 78 is described in greater detail in U.S. Pat. No. 8,328,507, the contents of which are hereby incorporated by reference herein.

The radially outboard portions of the rotors 60 and seal support members 62 are disposed in the hot core gas flow path 88 surrounding the compressor 52. The surface area of the portion of the rotor 60 that is being heated by the hot core gas flow path 88 far exceeds the surface area of the rotor 60 that is being cooled by the secondary cooling air flow path 86. The web 72 is relatively thin. While it's wetted area is large, the ability to conduct heat away from the rim 70 is limited by the conduction that can occur through the thin section of the web 72. Also, the relative velocity inside the rotor 60 is low, so the convection heat transfer from the web 72 is low. In order to increase the heat rejection to the secondary cooling air flow path 86, the presently disclosed embodiments incorporate one or more cooling features that operate to induce vortices that increase the local velocity in the secondary cooling air flow path 86, thereby increasing the heat transfer rate from the rotor 60 to the secondary cooling air flow path 86.

Figure 3:
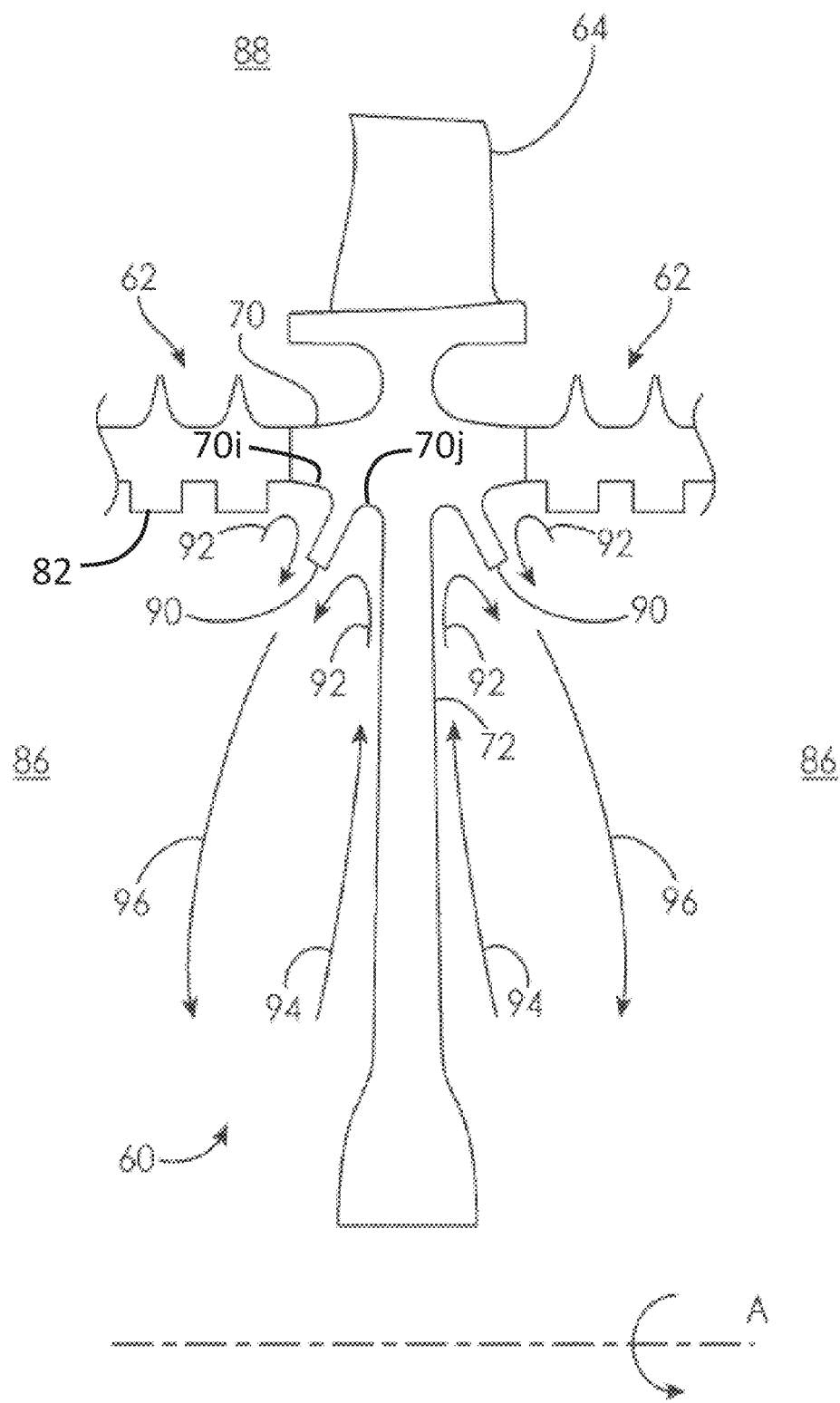
FIG. 3 is a schematic cross-sectional view of a rotor in an embodiment.

With reference to FIG. 3, one or more cooling features 90 may be incorporated extending from the radially inner rim surface 70i, from the web 72, or from a junction 70j of the radially inner rim surface 70i and the web 72. The cooling features 90 operate to induce vortices 92 adjacent to the disk rim 70 and/or web 72. The vortices 92 increase the local velocity in the secondary cooling air flow path 86 and therefore increase the heat transfer rate from the rotor 60 to the secondary cooling air flow path 86. The secondary cooling air flow path 86 originates from the radially inward portion of the compressor 52. This air is cooler and thus has a higher density than the air near the rim 70, causing it to flow radially outward by centrifugal force, as indicated by the path 94. When this airflow interacts with the cooling features 90, the vortices 92 are created, thereby increasing the local velocity in the secondary cooling air and therefore increasing the heat transfer rate from the rotor 60 to the secondary cooling air flow path 86. Thus heated, the secondary cooling air has lower density and flows radially inward as indicated by the path 96. The vortices 92 produced by the cooling features 90 therefore increase the efficiency of the heat transfer from the rotor 60 to the secondary cooling air flow path 86. It will be appreciated that the cooling features 90 are distinguished from the cooling fins 82 in that they are disposed on the rotor 60 rather than on the seal support member 62. Furthermore, the cooling features 90 are independent of any knife edge blade member 80.

Figure 4:
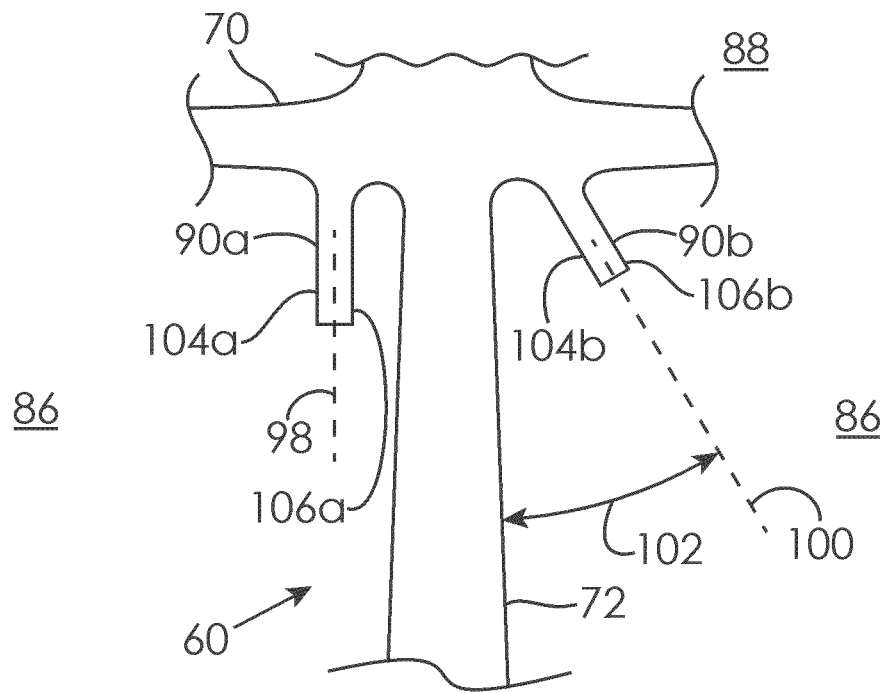
FIG. 4 is a schematic cross-sectional view of a rotor in an embodiment.

With reference to FIG. 4, an exemplary cooling feature 90a is illustrated in which the longitudinal axis 98 thereof is substantially perpendicular to the axis of rotation A. An exemplary cooling feature 90b is illustrated in which the longitudinal axis 100 thereof is disposed at an angle 102 with the adjacent surface of the web 72 of the rotor 60. In one embodiment, the angle 102 is less than 90 degrees. Each of the cooling features 90 comprises an axially upstream side 104 and an axially downstream side 106. The cooling features 90a and 90b each comprise respective sides 104 and 106 that are substantially parallel to one another.

Figure 5:
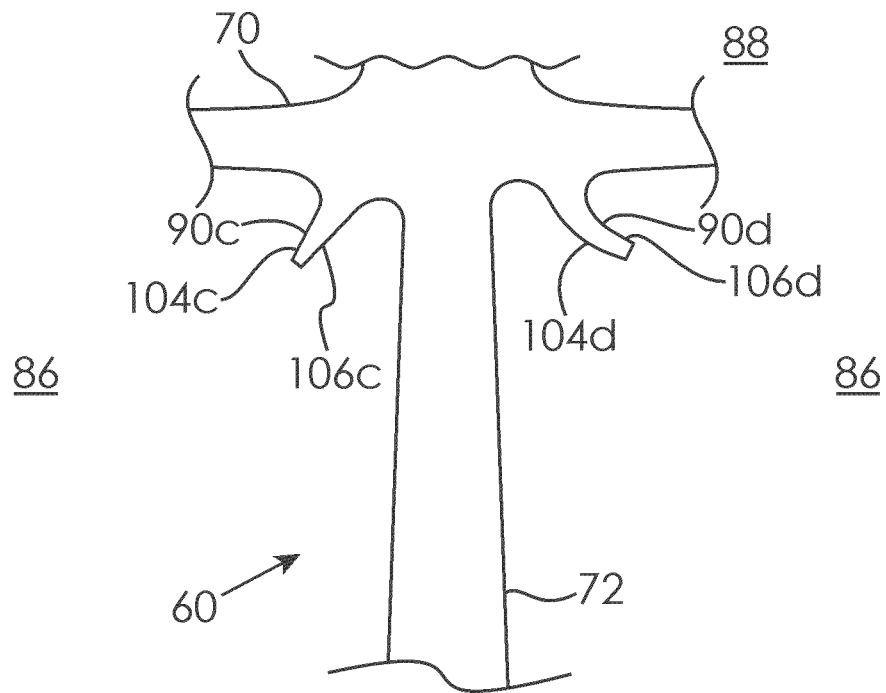
FIG. 5 is a schematic cross-sectional view of a rotor in an embodiment.
Figure 6:
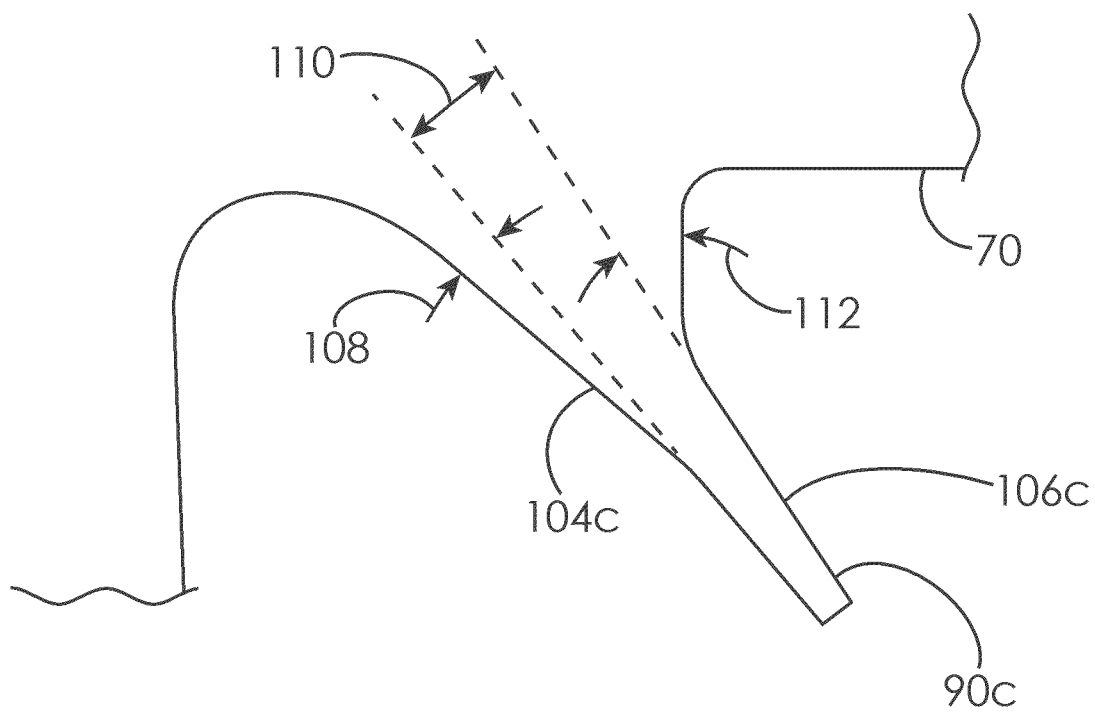
FIG. 6 is a schematic cross-sectional view of a rotor cooling feature in an embodiment.
Figure 7:
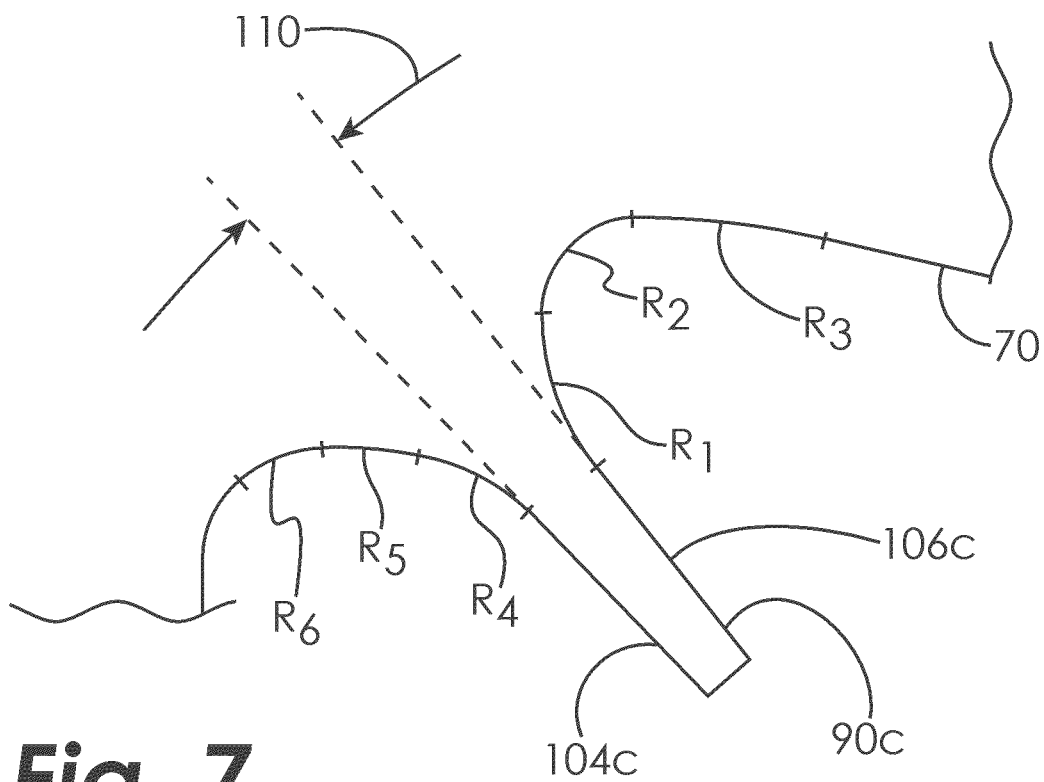
FIG. 7 is a schematic cross-sectional view of a rotor cooling feature in an embodiment.

With reference to FIG. 5, an exemplary cooling feature 90c is illustrated which comprises sides 104c and 106c that taper (i.e., the sides 104c and 106c are not substantially parallel to one another). In the embodiment illustrated in FIG. 5, the taper is singular (i.e. the sides 104c and 106c form a single angle with respect to one another along all portions of the sides 104c and 106c). In the embodiment illustrated in FIG. 6, the taper is multiple, i.e. the sides 104c and 106c from different angles 108, 110 and 112 in different regions of the sides 104c and 106c. A lesser or greater number of tapers may be used in other embodiments. In the embodiment illustrated in FIG. 7, the sides 104c and 106c taper with variable radii of curvature, i.e. R1≠R2≠R3 and R4≠R5≠R6.

Referring once again to FIG. 5, an exemplary cooling feature 90d is illustrated which comprises an axis that exhibits curvature. In some embodiments, the curvature is at a constant rate, and in other embodiments, the curvature is at a non-constant rate (i.e., the radius of curvature increases and/or decreases along the axis of the cooling feature 90d). In some embodiments, an cooling feature 90 may taper and also comprise and axis that exhibits curvature. The cooling features 90a, 90b and 90d may comprise substantially constant thickness as illustrated or may comprise a thickness that varies in steps.

The web comprises a web longitudinal axis substantially perpendicular to the axis of rotation. In some embodiments, the rotor 60 includes an cooling feature 90 on only one side of the web longitudinal axis. In some embodiments, the rotor 60 includes a differently configured cooling feature 90 on opposite sides of the web longitudinal axis. In some embodiments, the rotor 60 includes more than one cooling feature 90 on one side of the web longitudinal axis. In some embodiments, an cooling feature 90 comprises a circumferentially extending ring that may be a unitary structure or a plurality of sections combined to form a ring. In some embodiments, a surface of an cooling feature 90 may be roughened.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. A rotor for a gas turbine engine, the rotor comprising:
a disk including a rim having a radially outer rim surface and a radially inner rim surface, and a radially extending web connected to the rim at a junction;
first and second cooling features configured to cool the disk and disposed on opposite sides of the web and the first and second cooling features directly extend from at least one of the rim, the web, and the junction in opposite directions, wherein each of the cooling features comprises a circumferentially extending ring and at least one of the cooling features extends from the radially inner rim surface or the junction and includes a feature longitudinal axis that includes curvature; and
a seal support member that is a circumferentially extending ring that abuts the rim, the seal support member having a seal assembly that includes a cooling fin.

2. The rotor of claim 1, further comprising:
a plurality of blades which extend from the radially outer rim surface.

3. The rotor of claim 1, wherein at least one of the cooling features is configured to increase a velocity of air adjacent the rotor when the rotor is rotating.

4. The rotor of claim 1, wherein the circumferentially extending ring comprises a plurality of sections combined to form a ring.

5. The rotor of claim 1, wherein:
the rotor includes an axis of rotation; and
wherein the feature longitudinal axis is perpendicular to the axis of rotation.

6. The rotor of claim 1, wherein:
the rotor includes an axis of rotation; and
wherein the feature longitudinal axis is disposed at an angle to the axis of rotation.

7. The rotor of claim 1, wherein:
at least one of the cooling features comprises an axially upstream feature side and an axially downstream feature side; and
the axially upstream feature side and the axially downstream feature side of at least one of the cooling features are parallel.

8. The rotor of claim 1, wherein:
wherein at least one of the cooling features comprises an axially upstream feature side and an axially downstream feature side; and
the axially upstream feature side and the axially downstream feature side of at least one of the cooling features taper.

9. The rotor of claim 8, wherein said at least one of the cooling features tapers with multiple radii of curvature.

10. The rotor of claim 1, wherein at least one of the cooling features includes a radius of curvature that is constant along an axis of at least one of the cooling features.

11. The rotor of claim 1, wherein at least one of the cooling features comprises a thickness that is constant.

12. The rotor of claim 1, wherein at least one of the cooling features comprises a thickness that varies in steps.

13. A spool for a gas turbine engine comprising:
a compressor rotor disk including a rim having a radially outer rim surface and a radially inner rim surface, and a radially extending web connected to the rim at a junction;
a first cooling feature configured to cool the compressor rotor disk, the first cooling feature directly extending from at least one of the rim, the web, and the junction in a first direction and disposed proximate a first side of the web; and
a second cooling feature configured to cool the compressor rotor disk, the first cooling feature directly extending from at least one of the rim, the web, and the junction in a second direction that is disposed opposite the first direction and is disposed proximate a second side of the web;
wherein at least one of the first and second cooling features is configured to increase a velocity of air adjacent the rotor when the rotor is rotating, and
wherein each of the cooling features comprises a circumferentially extending ring and at least one of the cooling features extends from the radially inner rim surface or the junction and includes a feature longitudinal axis that includes curvature.

14. The spool of claim 13, wherein:
the rotor includes an axis of rotation; and
the feature longitudinal axis that is perpendicular to the axis of rotation.

15. The spool of claim 13, wherein:
the rotor includes an axis of rotation; and
the feature longitudinal axis that is disposed at an angle to the axis of rotation.

16. The spool of claim 13, wherein:
wherein at least one of the first and second cooling features comprises an axially upstream feature side and an axially downstream feature side; and
the axially upstream feature side and the axially downstream feature side of at least one of the first and second cooling features taper.

17. The spool of claim 13, wherein at least one of the first and second cooling features includes a radius of curvature that increases along an axis of the at least one of the first and second cooling feature.

18. The spool of claim 13, wherein at least one of the first and second cooling features comprises a thickness that is constant.

* * * * *